United States Patent [19]

Andow

[11] Patent Number: 4,774,621
[45] Date of Patent: Sep. 27, 1988

[54] PROTECTIVE CONTROL METHOD AND APPARATUS

[75] Inventor: Fumio Andow, Hachioji, Japan

[73] Assignee: Kabushiki Kaisha Toshiba, Kawasaki, Japan

[21] Appl. No.: 760,562

[22] Filed: Jul. 30, 1985

[30] Foreign Application Priority Data

Jul. 31, 1984 [JP] Japan .................................. 59-161188

[51] Int. Cl.$^4$ ............................................. H02H 3/28
[52] U.S. Cl. ...................................... 361/80; 364/483; 364/492; 361/86; 361/87; 361/93
[58] Field of Search ....................... 361/78, 80, 86, 87, 361/93; 364/483, 492

[56] References Cited

U.S. PATENT DOCUMENTS

| | | | |
|---|---|---|---|
| 3,984,737 | 10/1976 | Okamura et al. | 317/36 |
| 4,333,151 | 6/1982 | Matsushima | 361/80 |
| 4,344,143 | 8/1982 | Kurosawa et al. | 361/80 |
| 4,577,254 | 3/1986 | Yamaura | 361/80 |

FOREIGN PATENT DOCUMENTS

| | | |
|---|---|---|
| 58-29471 | 6/1983 | Japan . |
| 59-123418 | 7/1984 | Japan . |
| 2036478 | 6/1980 | United Kingdom . |
| 2082407 | 3/1982 | United Kingdom . |

*Primary Examiner*—A. D. Pellinen
*Assistant Examiner*—Jeffrey A. Caffin
*Attorney, Agent, or Firm*—Foley & Lardner, Schwartz, Jeffery, Schwaab, Mack Blumenthal & Evans

[57] ABSTRACT

In an apparatus for producing data concerning a fault in an AC electric power system, an AC electric quantity is sampled at a frequency which is a multiple of the rated frequency of the AC electric quantity, and is stored, for later use as predicted values, and an arithmetic operation is performed on the sample values to produce a data concerning a fault in the power system. The predicted values are determined by the following equation:

$$Y_m = \left( K_o S_o + \sum_{l=1}^{n} K_l S_l \right) \times (-1)^m$$

where
 l and m represent natural numbers;
 n represents a natural number;
 $Y_m$ represents the predicted value for a specific time point;
 $S_o$ represents a sample value in advance of the specific time point by m/2 times the rated period;
 $S_l$ represents a value equal to $(-1)^l$ times the sample value at a time point in advance of the specific time point by l/2 times the rated period; and
 $K_o$ and $K_l$ represent constants satisfying the following relationship:

$$\begin{cases} K_o \neq 0, \sum_{l=1}^{n} K_l \neq 0 \\ 1 - \epsilon < K_o + \sum_{l=1}^{n} K_l < 1 + \epsilon \end{cases}$$

where $\epsilon$ represents the permissible range of error for the predicted value which may occur when the power system is operating at the rated frequency.

2 Claims, 7 Drawing Sheets

PROTECTIVE CONTROL METHOD AND APPARATUS

BACKGROUND OF THE INVENTION

The present invention relates to protective control method and apparatus, in which AC voltage or current of an electric power system is periodically sampled and stored, and the stored sample value is used in combination with the sample value at a time point a predetermined time interval after the stored sampled value for arithmetic operation.

Conventional systems for periodically sampling AC voltages and currents of a commercial frequency of an electric power system and performing arithmetic operation on the sampled values for the purpose of protection of the power system include digital-type protective relays to protect the power system from short-circuiting or grounding fault, digital-type fault-point locating systems to determine the distance to the fault point, and fault data outputting systems for outputting a function showing the phase-relationship of the voltages and currents during the fault relative to the voltages before the fault.

The sampling frequency is generally set to be an integral multiple of the rated commercial frequency, and is not varied even when the operating frequency varies. Sample values are generally stored and used for arithmetic operation. In some of the systems, each of the stored sample value is used, as a predicted value, in combination with another sample value sampled m/2 (m being a positive integer) times the rated period after the stored sample value.

Examples of systems which use such a combination of a stored sample value (as a predicted value) and the subsequent sample value are given below:

(1) Variation over-current relay

This relay operates when the variation in the vector of an AC current exceeds a predetermined value, i.e., when $$|I_\Delta| = |I - I'| > K_1 \qquad (1)$$

Here, $I_{66}$ represents the vector value of a change of the current;

$I$ represents the vector value of the current after the change;

$I'$ represents the vector value of the current before the change; and $K_1$ represents a positive constant.

$|I_\Delta|$ represents an absolute value of the vector $I_{66}$.

(2) Close-point fault direction discriminating system

The system determines the product of a stored sample value of a voltage $V'$ before a fault and a sample value of a current $I$ after the fault to disminate the direction of the fault. In place of the current, a difference between a stored sample value of the current $I'$ before the fault and a sample value of the current $I$ after the fault, i.e., an instantaneous value of a current variation $I_\Delta$ may be used. In this connection, reference is made to Japanese Patent Application Laid-open No. 123418/1984 (Application No. 230022/1982).

(3) Fault-point locating system

The system determines a current variation $I_{66}$ which is the difference between a pre-fault current $I'$ and a post-current $I$ and uses it in combination with a post-fault voltage $V$ and current $I$ to determine the distance to the fault point. Reference is made to Japanese Patent Application Publication No. 29471/1983 (Application No. 132575/1978).

(4) Fault data outputting system

The system outputs a function, such as $VI\cos\theta$, $V'I\sin\theta$ or $I\cos\theta$, which shows the relationship of the phase angle $\theta$ of the voltage $V$ and the current $I$ during a fault relative to a pre-fault voltage $V'$.

How the stored sample values of a current and a voltage before the variation are obtained is now described with reference to the drawings.

Figure 8:
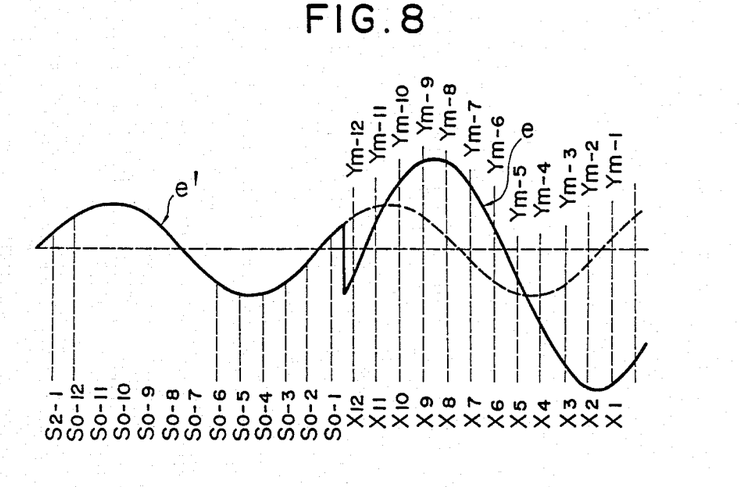
FIG. 8 is a time chart showing sampling time points against a sinusoidal curve in accordance with the embodiment of FIG. 7.
Figure 9:
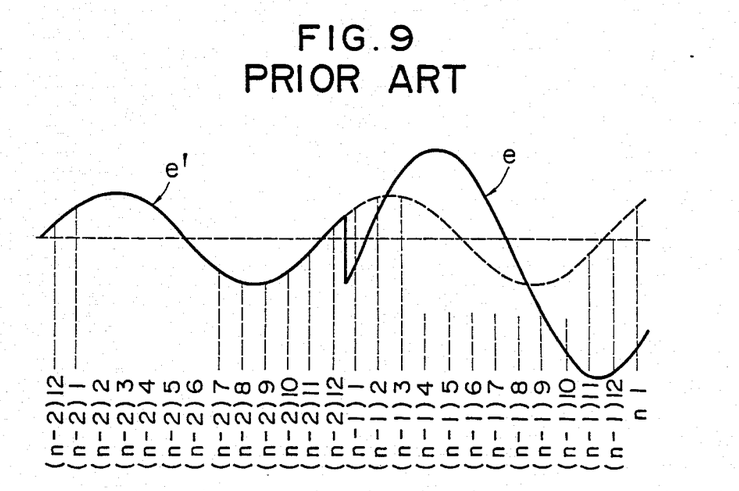
FIG. 9 is a time chart showing sampling time points against a sinusoidal curve of a typical AC electric quantity of a rated frequency.

FIG. 9 shows sampling time points against an AC electric quantity. Here it is assumed that 12 samples are taken during one rated period of the commercial frequency. (12 samples/period is assumed in the rest of the specification unless otherwise specified). In FIG. 8, $e'$ and $e$ respectively represent an electric quantity (voltage or current) before and after a change due for example to a fault. $(n-2)12, (n-1)1, \ldots (n-1)12, (n)1, \ldots (n)12, (n+1)1$ represent sampling time points. The value of the latter part $1, 2, \ldots 11, 12$ is increased by 1 or is changed from 12 to 1 every one sampling period and indicates the order of sampling within each period of the rated frequency. The value of the former part, e.g., $(n-2), (n-1), (n), (n+1), \ldots$, is increased by 1 each time the value of the latter part is changed from 12 to 1. For instance, the sampling time points $(n-1)1$ and $(n)1$ are apart from each other by one rated period. The sampling time points $(n)1$ and $(n)2$ are apart from each other by one sampling interval or 1/12 times one rated period. The stored sample value used as a predicted value for a sampling time point, say $(n)6$, is one of sample values at sampling time points m/2 times the rated period before $(n)6$, i.e., $(n-1)12, (n-1)6, (n-2)12, \ldots$ Where m is an even number, the sample value is used without change. Where m is an odd number, the sample value is used with its sign (+ or −) inverted. These stored sample values or predicted values equal the sample value at $(n)6$ if there occurs no change in the electric quantity $e'$.

Examples of equations for determining variation sample values are given below:

$$e''_{(n)6} = e_{(n)6} + e'_{(n-1)12} \qquad (2)$$

$$e''_{(n)6} = e_{(n)6} - 3'_{(n-1)6} \qquad (3)$$

$$e''_{(n)6} = e_{(n)6} + e'_{(n-2)12} \qquad (4)$$

Here, $e''_{(n)6}$ is a variation sample value at $(n)6$. $e(n)6$ is a sample value of the quantity $e$ at $(n)6$. $e'_{(n-1)12}$, $e'_{(n-1)6}$ and $e'_{(n-2)12}$ are sample values of the quantity $e'$ at $(n-1)12$, $(n-1)6$ and $(n-2)12$. The variation sample value $e''_{(n)6}$ equals an instantaneous value (which is also called in this specification "a sample value") of a variation quantity $$e'' = e - e' \quad (5)$$

at (n)6. Usually, a plurality of sample values are used for arithmetic operation, so that a plurality of predicted values are used.

Each of the stored sample values or predicted values for a certain time point, say (n)6, equals a sample value of the same time point (n)6 if the operating frequency is maintained at the rated frequency. If, however, the operating frequency deviates from the rated frequency, there occurs an error since the sampling frequency is fixed.

Figure 10:
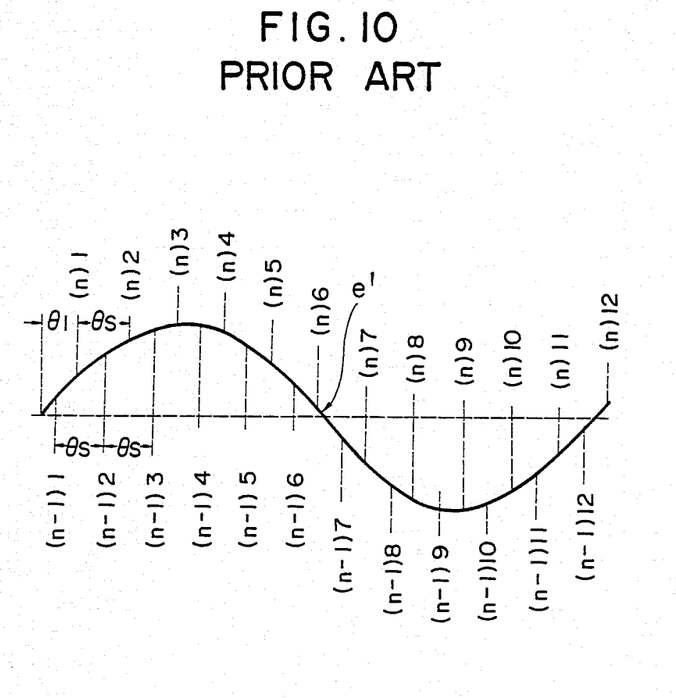
FIG. 10 is a time chart showing sampling time points against a sinusoidal curve of a frequency deviating from the rated frequency.

FIG. 10 shows how an error occurs when the operating frequency differs from the rated frequency. The same reference characters as in FIG. 9 have similar significances, but the sampling time points (n)1 through (n)12 and (n−1)1 through (n−1)12 are plotted within the same period of the same waveform of e' for easier understanding of the error. It is assumed that no change occurs in e'.

Assume that the sampling time point (n)1 is $\theta_1$ (electrical angle) after the crossing of e' through zero line from negative to positive. The respective sample values will then be as follows:

$$\left.\begin{aligned}
e'_{(n-1)1} &= E'\sin(\theta_1 - 12\theta_s) \\
e'_{(n-1)2} &= E'\sin(\theta_1 - 12\theta_s + \theta_s) \\
e'_{(n-1)3} &= E'\sin(\theta_1 - 12\theta_s) \\
&\cdot \\
&\cdot \\
&\cdot \\
e'_{(n-1)12} &= E'\sin(\theta_1 - 12\theta_s + 11\theta_s) \\
e'_{(n)1} &= E'\sin\theta_1 \\
e'_{(n)2} &= E'\sin(\theta_1 - \theta_s) \\
e'_{(n)3} &= E'\sin(\theta_1 - 2\theta_s)
\end{aligned}\right\} \quad (6)$$

Here, E' is the peak value of e', $\theta_s$ is the sampling interval in terms of electrical angle of the operating frequency of the power system.

If the operating frequency is f, and the rated frequency is $f_o$, then $$\theta_s = \frac{f}{f_o} \times \frac{360°}{12} \quad (7)$$

and $$\sin(\theta_1 - 12\theta_s + h\theta_s) = \sin\left(\theta_1 - \frac{f - f_o}{f_o} 360° + h\theta_s\right) \quad (8)$$

Here, h=1, 2, ... 12.

The sample values $e'_{(n-1)1}$, $e'_{(n-1)2}$, $e'_{(n-1)3}$ will therefore equal the samples of e' taken in advance of the sample values $e_{(n)1}'$, $e_{(n)2}'$, $e_{(n)3}'$ by $$\frac{f - f_o}{f_o} \times 360°.$$

In other words, the sample values e' taken one rated period before a specific time point equal the sample values of an imaginary value leading e' by $$\frac{f - f_o}{f_o} 360°$$

at the specific time point.

Similarly, the sample values of time points (m/2×one rated period) before the specific time point are given by the following equation:

$$\left(\text{The sample value of } e' \text{ of a time point} \left(\frac{m}{2} \times \text{one rated period}\right) \text{ before the specific time point}\right) \times \quad (9)$$

$$(-1)^m = \text{the sample value of } e'\angle^{m\theta}e \text{ at the specific time point}$$

$$\text{Here, } \theta_e = \frac{f - f_o}{f} 180° \quad (10)$$

$e'\angle^{m\theta}e$ represents an (imaginary) quantity leading e' by an angle $m\theta_e$, and is also expressed by $e'e^{jm\theta}e$.

If, therefore, the sample value taken at a time point (m/2×one rated period) before the specific time point and multiplied by $(-1)^m$ is used as the predicted value for the specific time point, a phase error of $m\theta_e$ occurs and the error of the predicted value from the sample value is a sample value (an instantaneous value) at the specific time point of a stored error $e'_e$ given by the following equation:

$$\begin{aligned}
e'_e &= e'\angle^{m\theta}e - e = e'\cos m\theta_e + je'\sin m\theta_e - e' \\
&= e'(\cos m\theta_e - 1 + j\sin m\theta_e) \\
&= 2e'\left(-\sin^2 \frac{m}{2}\theta_e = j\cos \frac{m}{2}\theta_e \sin \frac{m}{2}\theta_e\right) \\
&= 2e'\sin \frac{m}{2}\theta_e \left(-\sin \frac{m}{2}\theta_e + j\cos \frac{m}{2}\theta_e\right)
\end{aligned} \quad (11)$$

The magnitude $|e'_e|$ of e' is therefore given by:

$$\begin{aligned}
|e'_e| &= \left|2e'\sin \frac{m}{2}\theta_e\right| \times \sqrt{\sin^2 \frac{m}{2}\theta_e + \cos^2 \frac{m}{2}\theta_e} \\
&= \left|2e'\sin \frac{m}{2}\theta_e\right|
\end{aligned} \quad (12)$$

Thus, the ratio of $|e'_e|$ to $|e'|$ is $|2\sin/m2\theta_e|$.

Many of the digital relays use a plurality of samples in an arithmetic operation. Besides, a filter is used to prevent an error due to harmonics. Moreover, the electric quantities are in transient state for about ½ cycle (period) when there occurs a change in e'. As a result, variation sample values determined in accordance with Eq. (2), (3) or (4) using the sample values during transition will not properly reflect the variation quantity e''. For this reason, m is often set to satisfy $m \geq 2$.

Moreover, it is generally required that characteristics of protective relays be guaranteed even when the operating frequency deviates by $-2\%$ or $\pm 5\%$. If $m=2$ and the frequency deviation is $5\%$, then $m\theta_e=18°$ and the error $|e'_e|$ is as large as $31\%$. If $m=2$ and the frequency deviation is $2\%$, then $m\theta_e=7.2°$ and the error is $12.8\%$.

SUMMARY OF THE INVENTION

An object of the invention is to solve the abovedescribed problems.

Another object of the invention is to reduce the error in the predicted values even when the operating frequency differs from the rated frequency.

The invention is featured by use of the following equation in determining a predicted value for a specific time point:

$$Y_m = \left( K_o S_o + \sum_{l=1}^{n} K_l S_l \right) \times (-1)^m \quad (13)$$

where:
l and m represent natural numbers;
n represents natural number;
$Y_m$ represents the predicted value for a specific time point;
$S_o$ represents a sample value in advance of the specific time point by $m/2$ times the period of the rated frequency;
$S_l$ represents a value equal to $(-1)^l$ times the sample value at a time point in advance of the specific time point by $l+m/2$ times the period of the rated frequency; and
$K_o$ and $K_l$ represent constants satisfying the following relationship:

$$\begin{cases} K_o \neq 0, \sum_{l=1}^{n} K_l \neq 0 \\ 1 - \epsilon < K_o + \sum_{l=1}^{n} K_l < 1 + \epsilon \end{cases}$$

where $\epsilon$ represents the permissible range of error for the predicted value which may occur when the power system is operating at the rated frequency.

For instance, if $S_o$ is a sample value at (n)1 in FIG. 9, $S_1$ and $S_2$ are $(-1)^l$ times the respective sample values at $(n-1)7$ and $(n-1)1$, and $Y_1$ and $Y_2$ are predicted values for (n)7 and (n+1)1.

DETAILED DESCRIPTION OF THE PREFERRED EMBODIMENTS

Figure 2:
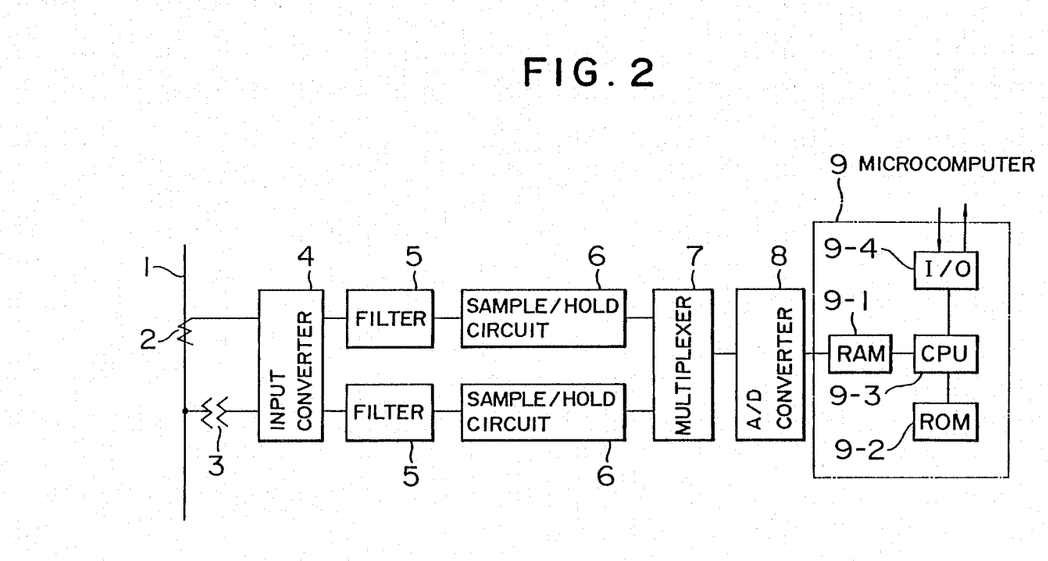
FIG. 2 is a block diagram showing a digital protective relay according to the invention.

As was described, the invention is applicable to arithmetic operation performed in a protective control system of a digital operation type which samples an electric quantity in an electric power system at a frequency which is a multiple of the rated frequency of the electric quantity. FIG. 2 shows an example of a digital protective relay.

In FIG. 2, a current and a voltage of a transmission line 1 are inputted through a current transformer 2 and a voltage transformer 3 to an input converter 4, where the current and the voltage are converted to signals of a level suitable for further processing. The outputs of the input converter 4 are passed through respective analog filters 5 for stabilization and are inputted to respective sample/hold (S/H) circuits 6, where they are converted to DC quantities. The outputs of the S/H circuits 6 are multiplexed by a multiplexer (MPX)7 and are then inputted to an analog/digital (A/D) converter 8, which converts the analog signals into digital signals or digital data. The digital data from the A/D converter 8 representing the current and the voltage are stored in turn in a data memory (RAM) 9-1 of a microcomputer 9.

Program instructions are stored in a program memory (ROM) 9-2, and a central processing unit (CPU) 9-3 performs arithmetic operation in accordance with the program instructions on the data stored in the RAM 9-1, makes judgement on the results of the arithmetic operation, and outputs the results of the judgement through an input/output interface (I/O) 9-4.

By the arithmetic operations performed by the CPU 9-3, a plurality of protective characteristics are realized.

Figure 1:
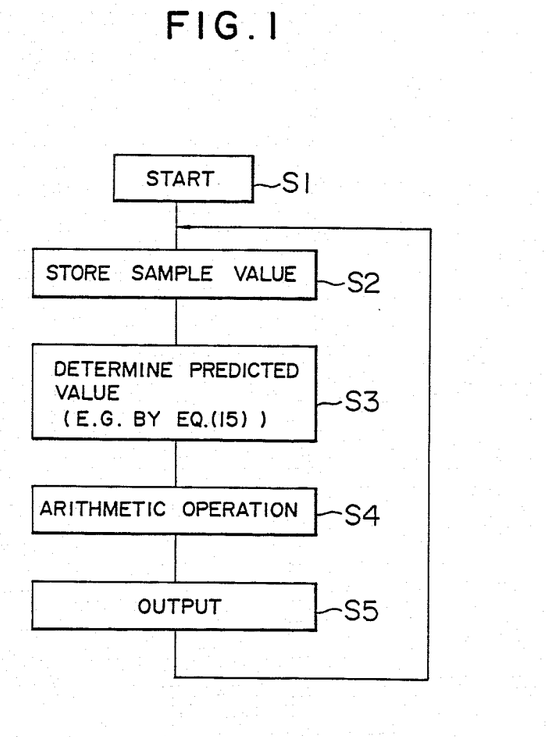
FIG. 1 is a flow chart showing an operation of a protective control system according to the invention.

FIG. 1 shows operations of the system according to the invention. At a step S1, the operation is started. At a step S2, digital sample values of various electric quantities including the electric quantity $e'$ are stored or written in the RAM and the old values which are no longer necessary are abandoned. At a step S3, predicted values are determined from the sample values having been written in by arithmetic operation in accordance with Eq. (13), or specifically Eq. (15) later described and are stored. At a step S4, a protective calculation or fault point determination operation is performed using the predicted values as well as the sample values stored.

At a step S5, a signal such as an operation command or no-operation command is outputted.

A feature of the invention lies in the specific way of determining the predicted values.

In an embodiment of the invention, the predicted values are determined by the following equations (15).

$$Y_m = \left\{ S_o + \frac{m}{k}(S_o - S_k) \right\} \times (-1)^m \qquad (15)$$
$$= \left\{ \left(\frac{m}{k} + 1\right)S_o - \frac{m}{k}S_k \right\} \times (-1)^m$$

where k is a positive integer.

Specific examples of Eq. (15) are:

$$Y_1 = -(2S_o - S_1) \qquad (16)$$

$$Y_2 = 3S_o - 2S_1 \qquad (17)$$

$$Y_3 = -(4S_o - 3S_1) \qquad (18)$$

$$Y_2 = S_o + \frac{2}{2}(S_o - S_2) = 2S_o - S_2 \qquad (19)$$

$$Y_3 = -\left\{ S_o + \frac{3}{2}(S_o - S_2) \right\} = -\left(\frac{5}{2}S_o - \frac{3}{2}S_2\right) \qquad (20)$$

$$Y_3 = -\left\{ S_o + \frac{3}{3}(S_o - S_3) \right\} = -(2S_o - S_3) \qquad (21)$$

Figure 3:
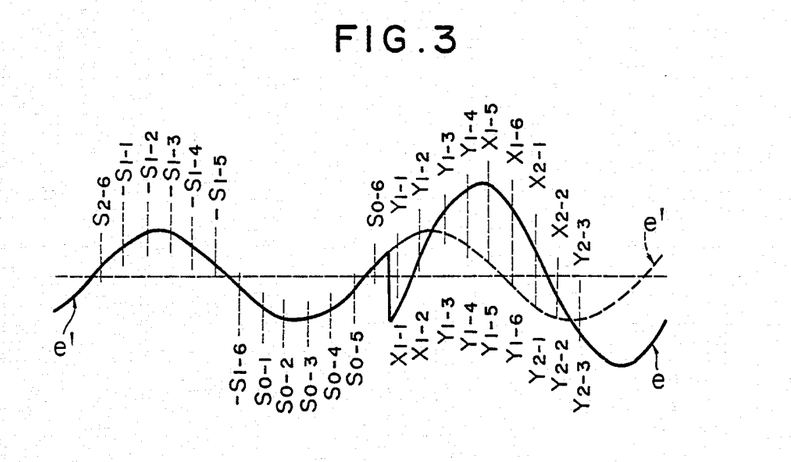
FIG. 3 is a time chart showing relationship between sample values and predicted values.

FIG. 3 illustrates the sample values and the predicted values of Eq. (16). It is assumed that the value of the electric quantity is changed from e' to e, and the operating frequency is maintained at the rated frequency.

In FIG. 3, S and X (with various suffixes) represent the sample values and Y (with various suffixes) represents the predicted values for X with the same suffixes. The sample values S (with various siffixes) have no corresponding predicted values yet.

It is noted that the suffixes of S, X and Y represent the time points of the corresponding values S, X and Y. The latter part of the suffixes is increased by 1 or changed from 6 to 1 every sampling interval and indicates the order of the sampling time points within a half period of the rated frequency. The former part of the suffixes of S is changed every half period of the rated frequency, and is increased toward the past, i.e., the sampling time points are farther away from the sampling time points of X.

It is assumed that a change from e' to e occurred between the time points (0-6) and (1-1) or the time points of the psampling of the sample values $S_{o\text{-}6}$ and $X_{1\text{-}1}$. When $S_o$ of Eq. (16) is $S_{o\text{-}h}$ (h=1 through 6), the sample value $-S_{1\text{-}h}$ which is equal in magnitude to $S_{o\text{-}h}$ and has the opposite sign is used as $S_1$, $-S_{l\text{-}h}$ being a sample value a half cycle before $S_{o\text{-}h}$. The predicted value $Y_{l\text{-}h}$ determined from those sample values is one for e' a half cycle after $S_{o\text{-}h}$. The predicted value $Y_{l\text{-}h}$ is used as a predicted value corresponding to the sample value $X_{l\text{-}h}$ of e' (after the change from e' to e).

In the case of Eq. (17), the sample values of $S_o$ and $S_1$ are used as $S_{o\text{-}h}$ and $S_{l\text{-}h}$ for determination of the predicted value $Y_{2\text{-}h}$. The predicted value $Y_{l\text{-}h}$ is determined from the sample values one half cycle before. The predicted values $Y_{l\text{-}h}$ and $Y_{2\text{-}h}$ are used as predicted values corresponding to sample values $X_{l\text{-}h}$ and $X_{2\text{-}h}$.

The predicted values are utilized in the following manner. When an arithmetic operation for determining the variation e″ (upon change of e' to e), is performed at the step S4, a variation sample value $\Delta_m$ is determined in accordance with the following equation.

$$\Delta_m = X_m - Y_m \qquad (22)$$

where $X_m$ is a sample value (m/2×one rated period) after the sample value $S_o$. When the reference characters of FIG. 3 are used, Eq. (22) can be rewritten, for the respective sample values, as follows:

$$\Delta_{m\text{-}h} = X_{m\text{-}h} - Y_{m\text{-}h} \qquad (23)$$

When an arithmetic operation of variation width over-current relay is performed, the arithmetic operation performed is similar to that performed for usual over-current relay except that the variation sample value $\Delta_m$ is used in place of the sample value $X_m$. The principle of the arithmetic operation is described, e.g., in "Protective Relay Engineering" of University Lecture Series by the Institute of Electrical Engineers of Japan, at page 112, Table 6.2 showing equations for determining X or $X^2$.

Moreover, Japanese Patent Application Laid-open No. 123418/1984 (Application No. 230032/1982) discloses a method of judging the direction of a fault point using the predicted values of voltage taken before occurrence of a fault and sample values or variation sample values of current taken after the fault. Japanese Patent Application Publication No. 29471/1983 (Application No. 132575/1978) discloses a method of determining the distance to a fault point using current sample values and current variation sample values and voltage sample values taken after the fault.

Figure 4:
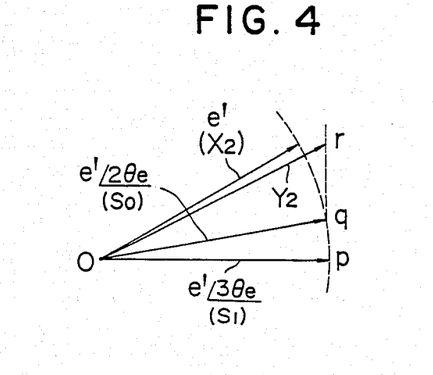
FIG. 4 is a vector diagram showing how the error in a predicted value is reduced.

Description will now be made on how the error in the predicted value is reduced by the use of Eq. (15). FIG. 4 shows e', e'∠2θe and e'∠3θe for m=2 and k=1, i.e., for Eq. (17). Assume that e', e'2θe and e'∠3θe are as illustrated, a sample value $X_2$ of a specific time point is the direct sample of e'. The sample value $S_0$ one rated period before that is an instantaneous value (a sample value) of e'∠2θe at the specific time point. The sample value $S_1$ which is $(-1)^3$ times a sample value 3/2 rated period before is an instantaneous value of e'∠3θe at the specific time point (see Eqs. (9) and (10)). The predicted value $Y_2$ equals $S_o + 2(S_o - S_1)$, so that it is represented by a vector Or, when r is a point along an extension of a line pq and satisfies qr=2pq. The error of the predicted value $Y_2$ is $Y_2 - e'$ and is smaller than the error e'∠2θe−e' which is the error when the sample value $S_o$ itself is used as the predicted value.

A further quantitative evaluation of reduction of error by the use of Eq. (15) is given below. Since $S_o$ x$(-1)^m$ and $S_k$ x$(-1)^m$ are instantaneous values of e'∠mθe and e'∠(m+k)θe at the specific time point, $(S_o - S_k) \times (-1)^m$ is an instantaneous value at the specific time point of the following quantity.

$$e' \angle m\theta_e - e' \angle (m+k)\theta_e \qquad (24)$$

$$= e'[\cos m\theta_e - \cos(m+k)\theta_e + j\{\sin m\theta_e - \sin(m+k)\theta_e\}]$$

$$= 2e'\left[-\sin\frac{2m+k}{2}\theta_e \sin\frac{-k}{2}\theta_e + j\sin\frac{-k}{2}\theta_e \cos\frac{2m+k}{2}\theta_e\right]$$

$$= 2e'\sin\frac{k}{2}\theta_e\left[\sin\frac{2m+k}{2}\theta_e - j\cos\frac{2m+k}{2}\theta_e\right]$$

The error of the predicted value is $Y_m - X_m$, so that from Eq. (15), $$Y_m - X_m = \{(-1)^m S_o - X_m\} + (-1)^m \frac{m}{k}(S_o - S_k) \qquad (25)$$

Since $(-1)^m S_o - X_m$ is an instantaneous value of $e'_e$ of Eq. (11) at the specific time point, it will be seen from Eqs. (11) and (25) that $Y_m - X_m$ is an instantaneous value at the specific value of:

$$e'_{el} = 2e'\left[\sin\frac{m}{2}\theta_e\left(-\sin\frac{m}{2}\theta_e + j\cos\frac{m}{2}\theta_e\right) + \frac{m}{k}\sin\frac{k}{2}\theta_e\left(\sin\frac{2m+k}{2}\theta_e - j\cos\frac{2m+k}{2}\theta_e\right)\right] \qquad (26)$$

$$= 2e'\left[\sin\frac{m}{2}\theta_e\left\{\sin\frac{2m+k}{2}\theta_e - \sin\frac{m}{2}\theta_e + j\left(\cos\frac{m}{2}\theta_e - \cos\frac{2m+k}{2}\theta_e\right)\right\} + \left(\frac{m}{k}\sin\frac{k}{2}\theta_e - \sin\frac{m}{2}\theta_e\right)\cdot\left(\sin\frac{2m+k}{2}\theta_e - j\cos\frac{2m+k}{2}\theta_e\right)\right]$$

When $m=k$ in Eq. (26), $\sin m/2\theta_e$ in the second term equals $m/k \sin k/2\theta_e$ and within a range where that part of the sinusoidal curve is linear i.e., the angle is not more than 30°, then $$\sin\frac{m}{2}\theta_e \approx \frac{m}{k}\sin\frac{k}{2}\theta_e$$

Also, $$\left|\sin\frac{2m+k}{2}\theta_e - j\cos\frac{2m+k}{2}\theta_e\right| = 1$$

if the term $$\left(\frac{m}{k}\sin\frac{k}{2}\theta_e - \sin\frac{m}{2}\theta_e\right)\left(\sin\frac{2m+k}{2}\theta_e - j\cos\frac{2m+k}{2}\theta_e\right)$$

is neglected, Eq. (26) can be rewritten as $$e'_{el} \approx 4e'\sin\frac{m}{2}\theta_e\left\{\sin\frac{m+k}{4}\theta_e \cos\frac{3m+k}{4}\theta_e + j\sin\frac{m+k}{4}\theta_e \cdot \sin\frac{3m+k}{4}\theta_e\right\} \qquad (27)$$

$$= 4e'\sin\frac{m}{2}\theta_e \sin\frac{m+k}{4}\theta_e\left(\cos\frac{3m+k}{4}\theta_e + j\sin\frac{3m+k}{4}\theta_e\right)$$

Here, $$\left|\cos\frac{3m+k}{4}\theta_e + j\sin\frac{3m+k}{4}\theta_e\right| = 1,$$

so that $$|e'_{el}| \approx 4\left|e'\sin\frac{m}{2}\theta_e \sin\frac{m+k}{4}\theta_e\right| \qquad (28)$$

The value of Eq. (28) is reduced to $$2\left|\sin\frac{m+k}{4}\theta_e\right|$$

x the value of Eq. (12). When the frequency variation is 5% and 2% respectively, $\theta_e = 9°$ and 3.6° respectively. If $m=k=2$, the error, which is 31% or 12% with Eq.(12), is reduced to 9.6% or 1.64%.

Thus, by use of the predicted value of Eq. (15), the error of the predicted value is substantially reduced.

A second embodiment of the invention determines the predicted value $Y_m$ by the following equation:

$$Y_m = \left[S_o + \frac{m}{k}\{(S_o - S_k) + (S_o - S_k) - (S_k - S_{2k})\}\right] \times (-1)^m \qquad (29)$$

$$= \left[\left(1 + 2\frac{m}{k}\right)S_o - 3\frac{m}{k}S_k + \frac{m}{k}S_{2k}\right] \times (-1)^m$$

If $k=1$, $m=1$, then $$Y_1 = -(3S_0 - 3S_1 + S_2) \qquad (30)$$

If $k=1$, $m=2$, then $$Y_2 = 5S_o - 6S_1 + 2S_2 \qquad (31)$$

If $k=2$, $m=2$, then $$Y_2 = 3S_o - 3S_2 + S_4 \qquad (32)$$

The predicted value of Eq. (29) is a combination of Eq. (15) and the term of $(S_o - S_k) - (S_k - S_{2k})$.

$\{(S_o - S_k) - (S_k - S_{2k})\} \times (-1)^m$ is an instantaneous value of
$\{e'\phi^m \theta e - e'\phi^{(m+k)\theta} e\} - \{e'\angle^{(m+k)\theta} e - e'\angle^{(m+2k)\theta} e\}$.
Similarly as with Eq. (24), $$e'\angle^{(m+k)\theta e} - e'\angle^{(m+2k)\theta e} = \qquad (33)$$

$$2e'\sin\frac{k}{2}\theta_e \left[ \sin\frac{2m+3k}{2}\theta_e - j\cos\frac{2m+3k}{2}\theta_e \right]$$

so that $$\{e'\angle^{m\theta e} - e'\angle^{(m+k)\theta e}\} - \{e'\angle^{(m+k)\theta e} - e'\angle^{(m+2k)\theta e}\} = \qquad (34)$$

$$2e'\sin\frac{k}{2}\theta_e \left[ \sin\frac{2m+k}{2}\theta_e - \sin\frac{2m+3k}{2}\theta_e + \right.$$

$$\left. j\left(\cos\frac{2m+3k}{2}\theta_e - \cos\frac{2m+k}{2}\theta_e\right)\right] =$$

$$4e'\sin^2\frac{k}{2}\theta_e[-\cos(m+k)\theta_e - j\sin(m+k)\theta_e]$$

The quantity $e'_{e2}$ corresponding to the error $Y_m - X_m$ of the predicted value is the sum of Eqs. (27) and (34). For simplicity, k is made to equal m, then $$e'_{e2} = 4e'\sin^2\frac{m}{2}\theta_e[\cos m\theta_e - \cos 2m\theta_e + j(\sin m\theta_e - \sin 2m\theta_e)] \qquad (35)$$

$$= 8e'\sin^3\frac{m}{2}\theta_e\left[\sin\frac{3}{2}m\theta_e - j\cos\frac{3}{2}m\theta_e\right]$$

The magnitude of the quantity $e'_{e2}$ corresponding to the error is therefore given by $$|e'_{e2}| = 8\left|e'\sin^3\frac{m}{2}\theta_e\right| \qquad (36)$$

This magnitude is $2|\sin m/2\theta_e|$ times the value of $|e'_{e1}|$ of Eq. (28) with m=k, i.e., $4|e'\sin m/2\theta_e|$.

Thus, with the use of Eq. (29) the error can be further reduced compared with Eq. (15).

A third embodiment of the invention uses correcting terms added to Eq. (29) as shown below:

$$Y_m = \left[ S_o + \frac{m}{k} \{(S_o - S_k) + (S_o - S_k) - \right. \qquad (37)$$

$$(S_k - S_{2k}) + (S_o - S_k) - (S_k - S_{2k}) - (S_k - S_{2k}) +$$

$$\left. (S_{2k} - S_{3k})\} \right] \times (-1)^m$$

$$= \left[ \left(1 + 3\frac{m}{k}\right) S_o - 6\frac{m}{k} S_k + 4\frac{m}{k} S_{2k} - \frac{m}{k} S_{3k} \right] \times$$

$$(-1)^m$$

If k=1, m=1, then $$Y_1 = -(4S_o - 6S_1 + 4S_2 - S_3) \qquad (38)$$

If k=1, m=2, then $$Y_2 = 7S_o - 12S_1 + 8S_2 - 2S_3 \qquad (39)$$

If k=2, m=2, then $$Y_2 = 4S_o - 6S_2 + 4S_4 - S_6 \qquad (40)$$

The predicted value of Eq. (37) has correcting terms:

$(S_o - S_k) - (S_k - S_{2k}) - \{(S_k - S_{2k}) - (S_{2k} - S_{3k})\}$ added to Eq. (29). By use of Eq. (37), further reduction in the error compared with Eq. (29) can be achieved. The reason for the achievement of the reduction from Eq. (29) by use of Eq. (37) is similar to the reason for achievement of the reduction from Eq. (15) by use of Eq. (29).

In a fourth embodiment of the invention, the equation for determining the predicted value $Y_{2k}$ is determined using the equation for determining the predicted value $Y_k$ for a preceding time point. $Y_{2k}$ is a predicted value for a time point k sampling periods after the time point for $Y_k$ and $Y_k$ is a predicted value for a time point k/2 times the period of the rated frequency after the time point of $S_o$.

For instance, in Eq. (29), when k is made to equal m, and the predicted value $Y_k$, and the sample values $S_o$ and $S_k$ are used in place of $S_o$, $S_k$ and $S_{2k}$ to determine $Y_{2k}$ (instead of $Y_m$), then $Y_{2k}$ is given by:

$$Y_{2k} = [3Y_k \times (-1)^k - 3S_o + S_k] \qquad (41)$$

$3Y_k \times (-1)^k$ of Eq. (41) is a term corresponding to $(1+2m/k)S_o$ of Eq. (29). The term of $(-1)^k$ is added because the polarity of $Y_k$ is opposite to $S_o$ if k is an odd number. The term of $(-1)^m$ of Eq. (29) is eliminated because the polarity of $Y_{2k}$ is the same as $S_o$.

From Eq. (29), $$Y_k = (b\ 3S_o - 3S_k + S_{2k}) \times (-1)^k \qquad (42)$$

Substituting Eq. (42) in Eq. (41), $$Y_{2k} = 6S_o - 8S_k + 3S_{2k} \qquad (43)$$

The predicted value $Y_{2k}$ is determined by this equation. If k=1, then $$Y_2 = 6S_o - 8S_1 + 3S_2 \qquad (44)$$

If k=2, then $$Y_4 = 6S_o - 8S_2 + 3S_4 \qquad (45)$$

The value of $Y_2$ of Eq. (44) slightly differs from Eq. (31). The difference will be explained with reference to FIG. 5, in which the same reference characters as in FIG. 4 indicate similar values. The sample value $X_2$ of a specific time point is a sample of $e'$. Predicted values $Y_2$ as determined by Eq. (31) and as determined by Eq. (44) corresponding to this sample value are determined from $S_o$, $S_1$ and $S_2$ which equal instantaneous values of $e'\angle^{2\theta}e$, $e'\angle^{3\theta}e$ and $e'\angle^{4\theta}e$ at the specific time point. $-Y_1$ is the predicted value for a time point ($\frac{1}{2}\times$rated period) before the specific time point. The sample value of this time point with its sign inverted equals the instantaneous value of $e'\phi^{74}e$ at the above-mentioned specific time point.

Figure 5:
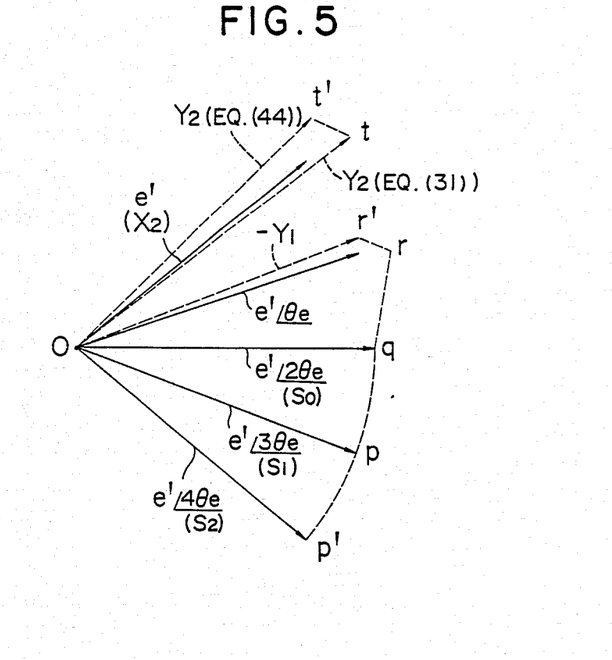
FIG. 5 is a vector diagram showing the differences between the predicted values of equations (31) and (44) to be described later.

When the Eqs. (30) and (31) are rewritten in the original form of the Eq. (29), $$-Y_1 = S_o + (S_o - S_1) + \{(S_o - S_1 - (S_1 - S_2)\} \tag{46}$$

$$Y_2 = S_o + 2(-Y_1 - S_o) \tag{47}$$

$-Y_1$ of the Eq. (46) is represented by a vector Or' in FIG. 5, where the point r' is located in the following manner. First, a point r is so located as to satisfy pq=qr along an extension of the line pq (representing $(S_o - S_1)$), where the vector Oq represents $S_o$. Then, the point r' is so located as to satisfy $rr' = (S_0 - S_1) - (S_1 - S_2)$.

$Y_2$ of the Eq. (47) is represented by a vector Ot, where the point t is so located as to satisfy tr'=2r'q, where 0q represents $S_0$ and r'q represents $(-Y_1 - S_o)$.

The difference between $Y_2$ (Eq. 31) and $X_2$ is the error of the predicted value. It will be seen that the error is much reduced in comparison with a situation where $S_o$ is used as the predicted value.

When the predicted value $Y_2$ of Eq. (44) is rewritten substituting $Y_1$ of Eq. (30) or (46), then $$Y_2 = -Y_1 + (-Y_1 - S_o) + \{(-Y_1 - S_o) - (S_o - S_1)\} \tag{48}$$

$Y_2$ in Eq. (48) is represented by a vector Ot', where t' is located in the following manner. First, a point t is located at a position deviating from r' (where Or' represents $-Y_1$) by qr' representing $(-Y_1 - S_o)$ Then t' is located at a position deviating from t by tt' (=rr') representing:

$$\{(-Y_1 - S_o) - (S_o - S_1)\}$$

The difference between this vector and $X_2$ is the error of the predicted value. It will be seen that a slight improvement is achieved over $Y_2$ of Eq. (31).

Now, a summary of the description of the first to the fourth embodiments is given.

Eq. (44) shows that changing the values of the coefficients of the embodiment of Eq. (31) will produce similar results. There are further possible modifications of Eq. (31). For instance the third term of Eq. (48) may be changed so that, $$Y_2 = -Y_1 + (-Y_1 - S_o) + \frac{1}{2}\{(-Y_1 - S_0) - (S_o - S_1)\} \tag{49}$$

Substituting Eq. (30) for $Y_1$, $$Y_2 = 5.5 S_o - 7 S_1 + 2.5 S_2 \tag{50}$$

The predicted value $Y_2$ is represented by a vector having its "head" at a midpoint between t and t' and this means that the error is further reduced.

Similar modifications of the coefficients are possible with respect to Eqs. (29) and (37) where three or more sample values are used. Although no specific example was given it is also possible to use five or more sample values. Eq. (13) is a general expression covering use of any number of sample values.

What is common throughout all the embodiments described so far is that the sum of the coefficient before being multiplied by $(-1)^m$ is 1. This means that the predicted value $Y_m \times (-1)^m$ does not have any error if the operating frequency equals the rated frequency and the absolute values of the sample values or $S_o, S_1, S_2, \ldots$ equal each other.

However, not all the combinations of the coefficients whose sum is 1 can be used. For instance, $$Y_1 = -\{S_1 + (S_1 + (S_1 - S_o)\} = -\{2S_1 - S_0\} \tag{51}$$

cannot be used because the error is larger than in the conventional method. It is difficult to generalize what combinations are usable and what are not.

A fifth embodiment of the invention is intended to further reduce the error. This embodiment is illustrative of the fact that the sum of the coefficient (before multiplication by $(-1)^m$ need not be 1, but a good approximation can be obtained. A permissible range of approximation is shown in Eq. (14). Within this range, the error of the predicted value in case of the rated frequency is within $\epsilon$. An example is shown in the following equation.

$$\begin{aligned} Y_1 &= -\{0.9877 S_o + (0.9877 S_o - S_1)\} \\ &= -(1.9754 S_o - S_1) \end{aligned} \tag{52}$$

Here, the sum of the coefficients (before multiplication by $(-1)^m$) is 0.9754. In this case, the error of the predicted value $Y_1$ is 2.45% if the operating frequency equals the rated frequency. On the other hand, when the operating frequency is 5% above or below the rated frequency, the error will become zero. This will be explained referring to FIG. 6.

Figure 6:
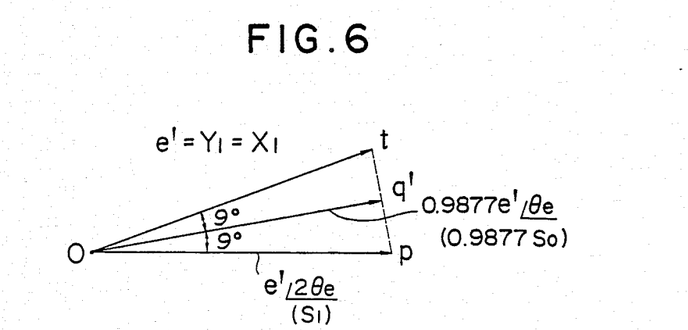
FIG. 6 is a vector diagram showing the error of the predicted value of an equation (52) described later.

FIG. 6 illustrates the error which will result when the predicted value $Y_1$ corresponding to the sample value $X_1$ is determined from the sample values $S_o$ and $S_1$. $S_o$ and $S_1$ are samples of $e' \angle^\theta e$ and $e' \angle 2\theta e$ taken at the specific time point. $0.9877 S_o$ is a sample of $0.9877 \, e' \angle^\theta e$ at the specific time point. The point q' in FIG. 6 shows such a value. The predicted value $Y_1$ is (a sample of) an electric quantity Ot, where t is positioned along an extension of the line pq' and q't=pq', and $pq' = 0.9877 S_o - S_1$.

$0.9877 \div \cos 9°$. When the frequency error is 5%, the angle $\theta_e = 9°$. The angle pq'O is therefore a right angle. Since line q't=line pq', the angle q'Ot=$\theta_e$, and |line Ot|=|line Op|. The line Ot therefore represents the vector of e' Thus, the error of the predicted value for the frequency error of 5% is zero.

Thus, with the embodiment of Eq. (52), there occurs some error of the predicted value when the operating frequency is the rated frequency. But when the error of the operating frequency is at or near 5%, the error in the predicted value is reduced. Thus, the values of the coefficients $K_o$ through $K_n$ may be varied within the range of Expression (14). Specifically, similar results may be obtained if approximation is used where the sum of the coefficients of the right side, except the terms of $(-1)^m$, of any of Eqs. (15), (29), (37) and (41) is within the range of $(1-\epsilon)$ through $(1+\epsilon)$.

In the various embodiments described above, the sample values of the electric quantity $e'$ are used directly for the determination of the predicted values. But in a sixth embodiment, which will now be described, a sum of or a difference between a plurality of sample values is used as a "sample value" for determination of the predicted values.

For instance, where the predicted values of differences $e_a' - e_b'$, $e_b' - e_c'$, and $e_c' - e_a'$ between every two of three phase electric quantities $e_a'$, $e_b'$ and $e_c'$ are needed, differences between the sample values of $e_a'$ and $e_b'$, $e_b'$ and $e_c'$, and $e_c'$ and $e_a'$ are determined and used with r without sign inversion, as $S_o$, $S_1$, $S_2$, ... in the various equations.

Where predicted values of a positive-phase-sequence component:

$$e'_{a1} = \frac{e'_a + e'_b \angle 120° + e'_c \angle 240°}{3} \quad (53)$$

is to be determined, sample values of $e_a'$, $e_b'$ and $e_c'$ at different sampling time points are added and the result is used as a sample value of $e_{a1}'$. An example of a sample value $S_{a1(n-1)8}$ of $e_{a1}'$ is given by:

$$S_{a(n-1)8} - S_{b(n-1)6} - S_{c(n-1)1} = S_{a1(n-1)8} \quad (54)$$

Here, $S_{a(n-1)8}$ is a sample value of $e_a'$ at a time point (n-1)8 in FIG. 8, $S_{b(n-1)6}$ is a sample value of $e_b'$ at (n-1)6, $S_{c(n-1)10}$ is a sample value of $e_c'$ at (n-1)10, and $S_{a1(n-1)8}$ is a "sample value" equal to three times an instantaneous value of $e_{a1}'$ at (n-1)8.

$S_{b(n-1)6}$ in Eq. (54) is a sample value of $e_b'$ at a time point 60° before a time point (n-1)8, and equals an instantaneous value at the time point (n-1)8 of an imaginary quantity 60° lagging behind $e_b'$. The same quantity with its sign inverted equals an instantaneous value at the time point (n-1)8 pof an imaginary quantity $e_b' \angle 120°$ in advance of $e_b'$ by 120°. Similarly, $S_{c(n-1)10}$ equals a sample value of $e_c' \angle 240°$ at (n-1)8.

The sum sample value $S_{a1(n-1)8}$ therefore equals three times the sample value of $e_{a1}'$ at a time point (n-1)8. Similar sum sample values are obtained for other sampling time points and predicted values proportional to $e_{a1}'$ are thereby determined.

It will thus be seen that, according to the invention, sums or differences of sample values of $e'$ at the same or different time points may be used as "sample values" for determination of predicted values.

A seventh embodiment of the invention will now be described.

With the various embodiments described above, when a fault occurs in the power system and some time has passed and the sample values taken after the fault begin to be used as $S_o$, the predicted values will not correspond to those before the fault. Usually, a sequential control is so arranged that response during a period when the predicted values correspond to the values before the fault is effective and response after such a period is disregarded. With such an arrangement, there is no problem. But it is sometimes required that the values before the fault are kept longer.

Figure 7:
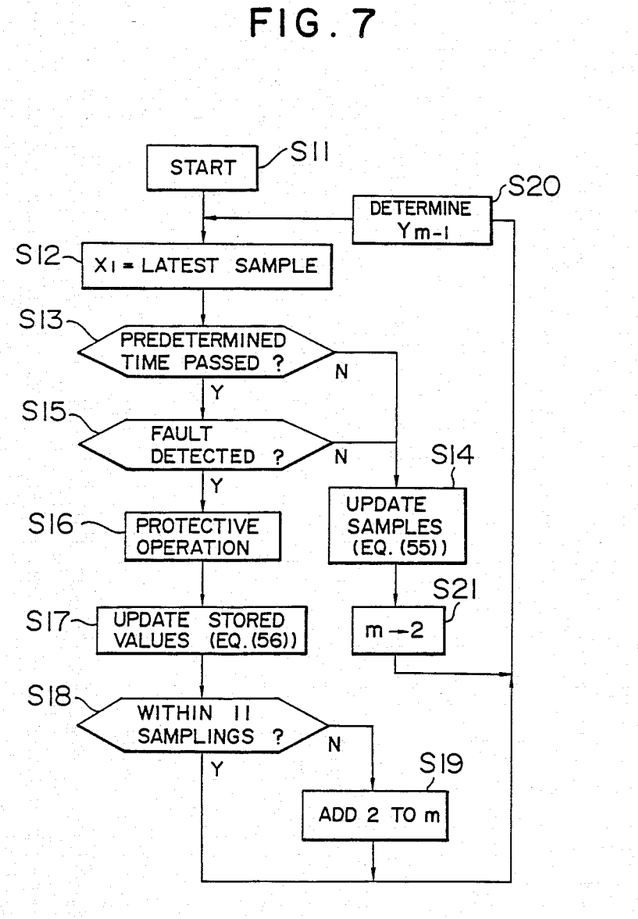
FIG. 7 is a flow chart showing an operation of another embodiment of a protective control system according to the invention.

FIG. 7 shows an arrangement which can be used where the values before the fault are kept longer. It is assumed that k=2 in Eq. (15) and m is normally 2, i.e., m=2 when there is no fault (m being made larger during transition due to a fault).

At a step S11 the operation is started. At a step S12, the latest sample value is taken in as $X_1$. At a step S13, it is judged whether or not a predetermined time has passed after the start. If the predetermined time has not passed, then at a step S14, the stored sample values are rewritten as follows:

$$\left.\begin{array}{l} X_1 \to X_2, X_2 \to X_3 \ldots X_{11} \to X_{12} \\ Y_{m-1} \to Y_{m-2}, Y_{m-2} \to Y_{m-3} \ldots Y_{m-11} \to Y_{m-12} \\ X_{12} \to S_{o-1}, S_{o-1} \to S_{o-2} \ldots S_{o-11} \to S_{o-12} \\ S_{o-12} \to S_{2-1}, S_{2-1} \to S_{2-2} \ldots S_{2-11} \to S_{2-12} \\ S_{2-12}, Y_{m-12} \to \text{ABANDON} \ldots \end{array}\right\} \quad (55)$$

Here, $S_{o-1}$ through $S_{o-12}$, $S_{2-1}$ through $S_{2-12}$, $Y_{m-1}$ through $Y_{m-12}$ are sample values corresponding to $S_o$, $S_k$, $Y_m$ if k=2 in Eq. (15). It is noted that the suffixes of X and the latter parts of the suffixes of S and Y are increased by 1 or are changed from 12 to 1 toward the past every sampling interval. The former parts of the suffix of S is increased by 2 toward the past each time the latter part of the suffix is changed from 12 to 1. The relationship of the sampling time points is shown in FIG. 8.

After the step 14, the value of m in Eq. (57) later described is set at 2, at a step 21.

If, at the step 13, the predetermined time has passed, then at a step 15 a fault detection is conducted. The fault detection can be accomplished in any of various ways. For instance, arithmetic operation of a known distance relay or the above described variation width over-current relay may be used. If no fault is found, then at the step 14, the samples are updated.

When a fault is detected, then at a step S16, a protective operation is carried out, and at a step S17, the stored values are updated as follows:

$$\left.\begin{array}{l} X_1 \to X_2, X_2 \to X_3 \ldots X_{11} \to X_{12} \\ Y_{m-1} \to Y_{m-2}, Y_{m-2} \to Y_{m-3} \ldots Y_{m-11} \to Y_{m-12} \\ S_{o-12} \to S_{o-1}, S_{o-2} \to S_{o-3} \ldots S_{o-11} \to S_{o-12} \\ S_{2-12} \to S_{2-1}, S_{2-2} \to S_{2-3} \ldots S_{2-11} \to S_{2-12} \\ X_{12}, Y_{m-12} \to \text{ABANDON} \end{array}\right\} \quad (56)$$

Then, at a step S18, it is judged whether or not there have been not more than 11 samplings since the latest addition of 2 to m at a step S19. If there have been more than 11 samplings, then at the step S19, 2 is added to m of $Y_m$. After the step S21, S18 or S19, then at a step S20, $Y_{m-1}$ is determined in accordance with the following equation:

$$Y_{m-1} = \left(\frac{m}{2} + 1\right)S_{o-1} - \frac{m}{2}S_{2-1} \tag{57}$$

Thus, when the predetermined time has not passed (step 13) or when no fault is detected (step 15), the sample values are updated by the expression (55), whereby the oldest sample value is abandoned or destroyed and the other sample values are shifted. $S_{o-1}$ and $S_{2-1}$ represent sample values in advance of $X_1$ by 1 period or 2 periods of the rated frequency, and m=2. The predicted value determined at the step S20 in accordance with Eq. (57) is:

$$Y_{2-1} = 2S_{o-1} - S_{2-1} \tag{58}$$

These values are shifted in turn and the stored values $S_{o-h}$, $S_{2-h}$ are sample values at time points one or two periods before $X_h$ (h=1 through 12), and the predicted values $Y_{2-h}$ are determined as values at the sampling time point of $X_h$ by use of Eq. (15) with k=2 and m=2.

In the updating at the step S17 subsequent to detection of a fault at the step 15, the sample value $X_{12}$ is abandoned and $S_{o-12}$ and $S_{2-12}$ are re-utilized as $S_{o-1}$ and $S_{2-1}$. If it is so arranged that a fault is detected $\frac{1}{2} - \frac{3}{4}$ cycle after the occurrence of the fault, all the sample values taken after the occurrence of the fault will be abandoned as $X_{12}$ and will never be used as $S_{o-1}$ and $S_{2-1}$. The newly stored (updated) values of $S_{o-1}$ and $S_{2-1}$ are values of sampling time points within the preceding cycles (periods), and are therefore sample values of the sampling time points within cycles two and three, respectively, cycles before the sample values $X_1$.

During the first processing immediately after detection of a fault, it will not be judged at the step 18 that it is within 11 sampling periods after the addition of 2 to m, so that the step 19 is effected wherein 2 is added to m to result in m=4. The predicted value thereafter determined by Eq. (57) at the step S20 is $$Y_{4-1} = 3S_{o-1} - 2S_{2-1} \tag{59}$$

This means that the predicted value for the sampling time point of $X_1$ is given by substituting k=2 and m=4 in Eq. (15).

During the second to twelfth processings, it will be judged that it is within 11 sampling periods after the addition of 2 to m at the step S18, so that processing of the step S19 is not effected. In other words, the predicted values are determined by Eq. (59) with m being kept at 4. In the subsequent, i.e., the thirteenth processing, the addition of 2 1 to m at the step S19 is effected to make m=6. The equation for determining the predicted value is thereby changed to $$Y_{6-1} = 4S_{o-1} - 3S_{2-1} \tag{60}$$

Thus in the embodiment shown by the flow chart of FIG. 7, after detection of a fault, the sample values $S_{o-1}$ through $S_{o-12}$ and $S_{2-1}$ through $S_{2-12}$ are retained and resued for determination of predicted values by Eq. (15) or (57), and the factor m is successively increased to be 2, 4, 6, . . . In this manner, predicted values are determined with smaller errors for a long period, i.e., 1, 2, 3 cycles after the sampling time points of $S_o$.

The successive increase of m is possible with other equations, e.g. Eqs. (29) and (37). In other words, similar results are obtained by successively changing $K_o$, $K_l$ and m after detection of a fault.

As has been described, according to the invention, the error of the predicted value is substantially reduced even when the operating frequency differs from the rated frequency.

What is claimed is:

1. A protective control apparatus for sampling an AC voltage and/or current in an electric power system at a frequency which is an integral multiple of the rated frequency of said electric power system, converting said sampled value into a digital value, memorizing the digital value, and processing the memorized digital value or a synthetic value comprising:

a first means for calculating a product $K_oS_o$ by multiplying a constant $K_o$ and a value (said digital value or a synthetic value thereof) $S_o$, which is obtained by a sampling at a first predetermined time which is prior to a second predetermined time by the amount of m/2 (m equals to a natural number) times the period of the rated frequency;

a second means for calculating a product $K_lS_l$ by multiplying a constant $K_l$ and at least a selected value among plural values $S_l$ (l equals to one of natural numbers 1-n), said selected value being obtained by multiplying $(-1)^l$ and a sampled value obtained by sampling at a third predetermined time which is prior to the first predetermined time by the amount of l/2 times the period of the rated frequency;

a third means for calculating a predicted value $Y_m$ at the second predetermined time based upon a value obtained by sampling at the first predetermined time and a value at a time prior to the first predetermined time according to the following equation $$Y_m = \left(K_oS_o + \sum_{l=1}^{n} K_lS_l\right) \times (-1)^m,$$

utilizing said product $K_oS_o$ obtained by said first means and said product $K_lS_l$ obtained by said second means;

a fourth means for calculating a variation value $\Delta m$ according to the following equation $$\Delta m = X_m - Y_m,$$

being based upon said value $X_m$ obtained at the second predetermined time and said predicted value $Y_m$; and a fifth means for rendering a protective control operation, utilizing the variation value $\Delta m$;

whereby said constants $K_o$ and $K_l$ satisfy the following conditions $$K_o \neq 0, \sum_{l=1}^{n} K_l \neq 0$$

-continued $$1 - \epsilon < K_o + \sum_{l=1}^{n} K_l < 1 + \epsilon$$

where $\epsilon$ is considerably less than 1, so that when said voltage or current is a sine wave of the rated frequency, said variation value $\Delta m$ is expressed by the following equation $|\Delta m| < |\epsilon X_m|$ and, wherein the predicted values are determined by the following equation:

$$Y_m = \left\{ \left( \frac{m}{k} + 1 \right) S_o - \frac{m}{k} S_k \right\} \times (-1)^m$$

where $S_k$ is a specific term of $S_l$, with l being equal to k which is a natural number, or an approximation of the value given by the above equation.

2. The apparatus of claim 7, wherein the predicted values are determined by the following equation:

$$Y_m = \left[ \left( 1 + 2\frac{m}{k} \right) S_o - 3\frac{m}{k} S_k + \frac{m}{k} S_{2k} \right] \times (-1)^m$$

where $S_k$ and $S_{2k}$ are specific terms of $S_l$ with l being equal to k or 2k, k being a natural number, or approximations of the value given by the above equation.

* * * * *